United States Patent [19]

Egger

[11] Patent Number: 4,798,281

[45] Date of Patent: Jan. 17, 1989

[54] CARRIER FOR USE ON A DRAG CHAIN CONVEYOR

[75] Inventor: Walter C. Egger, Zurich, Switzerland

[73] Assignee: VT-Verpackungstechnik Zurich, Zurich, Switzerland

[21] Appl. No.: 864,092

[22] Filed: May 15, 1986

Related U.S. Application Data

[63] Continuation-in-part of Ser. No. 603,247, Apr. 23, 1984, abandoned.

[30] Foreign Application Priority Data

Apr. 26, 1983 [CH] Switzerland ............... 2215/83
Mar. 5, 1984 [CH] Switzerland ............... 1078/84

[51] Int. Cl.$^4$ ............................................. B65G 15/44
[52] U.S. Cl. ................................. 198/698; 198/628
[58] Field of Search ............... 198/626, 628, 690.2, 198/698, 699, 620, 604

[56] References Cited

U.S. PATENT DOCUMENTS

| | | | |
|---|---|---|---|
| 2,297,296 | 9/1942 | Flintjer | 198/626 |
| 2,395,761 | 2/1946 | Reed | 198/699 |
| 2,667,386 | 1/1954 | Mathisen | 198/698 |
| 2,734,621 | 2/1956 | Mojonnier | 198/628 |
| 3,741,744 | 6/1973 | Bowman | 198/620 |
| 3,869,038 | 3/1975 | Piper et al. | 198/626 |
| 4,064,987 | 12/1977 | Rowan | 198/604 |
| 4,147,251 | 4/1979 | Focke | 198/698 |
| 4,465,178 | 8/1984 | Coggon | 198/690.2 |
| 4,629,063 | 12/1986 | Hodlewsky et al. | 198/690.2 |

FOREIGN PATENT DOCUMENTS

| | | | |
|---|---|---|---|
| 213046 | 1/1961 | Austria | 198/628 |
| 721573 | 12/1972 | Italy | 198/626 |

Primary Examiner—Joseph E. Valenza
Attorney, Agent, or Firm—Ladas & Parry

[57] ABSTRACT

A carrier, consisting of a holder and a gripper, is provided for use on a drag chain conveyor used particularly for the conveyance of loose articles such as bottles. The chain conveyor comprises a pair of conveyor chains in spaced substantially parallel relationship, both of the chains moving in the same direction along a conveyance channel. Carriers of the invention are carried by links in each of the chains with the grippers thereof disposed inwardly into the space between the two conveyor chains. Loose articles in the space are engaged by the grippers and moved thereby. The holder comprises a plate and a bow and is connected to a link of the conveyor chain. The holder is supported on slide rails. The gripper is a hollow, tube-shaped member made of resilient material and has a flat surface which lies against the plate. The gripper is fastened to the plate by bolts anchored in the plate and which pass through the flat surface of the gripper. Spring nuts fasten to the bolts. In one embodiment of the carrier, the gripper has a plurality of grooves therein extending parallel to the axis thereof. The gripper consists of chloroprene rubber.

9 Claims, 4 Drawing Sheets

CARRIER FOR USE ON A DRAG CHAIN CONVEYOR

This is a continuation-in-part of the copending application Ser. No. 603,247 filed 4-23-84 now abandoned.

BACKGROUND OF THE INVENTION

This invention relates to a carrier member for use on a drag chain conveyor for loose articles.

Drag chain conveyors are frequently used for the conveyance of loose articles, for example bottles in bottle washing machines. Such drag chain conveyors normally comprise two conveyor chains which are spaced apart and parallel to each other. The conveyor chains are actuated to move in the same direction. The space defined between the two conveyor chains is the conveying channel. Associated with some or all of the links on each of the conveyor chains is a carrier member. These carrier members are disposed such that they extend inwardly into the conveying channel so that loose articles in this channel are engaged by such carriers and moved thereby.

Each carrier member usually consists of a gripper member for gripping the loose articles in the conveying channel, and a holder connectable to a chain link as well as to the gripper member.

In drag chain conveyors of this kind, provision is frequently made for lubricating the chain guide with oil. As a consequence, the gripper members and particularly those parts of the gripper members near the chain, are often in an oily atmosphere during operation. Moreover, if the drag chain conveyor is operated in conjunction with a bottle washing machine, washing liquid may also be splashed onto the gripper members. Additionally, in the beverages industry, the drag chain conveyors are regularly cleaned with superheated high-pressure steam. All these factors directly affect the life of the gripper members. Thus it is important that a suitable resilient material is chosen for the gripper members so that a maximum life therefor is obtained.

Yet a further problem in relation to the gripper members is the maintenance of the adhesive force between the gripper members and the articles to be conveyed. In the case of bottle-washing, there is a danger that the bottles may escape from the grip of the gripper members if at a point of deflection of the conveyor the longitudinal axes of the bottles (which are gripped at their sides) lie in the direction of the centrifugal force applied to the bottles. This point of deflection may occur at a bend in the conveyor chains or at a joinder point between conveyor chains or between a conveyor chain and another object.

In order to increase the gripping properties of the gripper members, prior art carrier members have been provided wherein the gripping surface has a number of sharp-edged ribs with smooth surfaces therebetween. While this may be adequate for use in a dry atmosphere, the adhesive power of these grippers is however significantly reduced in a wet atmosphere since the ribs do not prevent the formation of a film of liquid on the article and further assist the retention of the film. In addition, ribs have the disadvantage that when they act on, for example a glass article, there is a minimal surface area contact between the glass article and the gripper member (i.e. at the rib edges only) so that the adhesive power is considerably reduced. Prior art devices are disclosed in U.S. Pat. Nos. 2,734,621, 2,297,295, 2,297,296 and Italian Pat. No. 721573.

U.S. Pat. No. 2,734,621 teaches the moving of bottles in an upright position. This movement is achieved by squeezing the bottles between two so-called flexible chains. These chains comprise metal plates flexibly joined by links and lined with a rubber lining. The effectiveness of the movement of the bottles within the conveyor depends to a large extent upon whether there is sufficient contact between the rubber lining and a very small part of the bottle surface (essentially a point contact). To facilitate proper contact, a plurality of complicated spring assemblies are necessary.

U.S. Pat. Nos. 2,297,295 and 2,297,296 disclose carrier systems comprised of an endless rubber hose that defines in its surface a number of regularly spaced intervals having horizontally disposed axes. The carrier transports items by making a first point contact and a second vertically disposed area contact. The effectiveness of the movement of the items depends upon the orientation of the major axis of the items being carried for sufficient contact between the carrier and the item.

Italian Pat. No. 721573 discloses a carrying device which uses grippers that consist of a metallic plate upon which trapezoidal-shaped rubber pieces are mounted. These rubber pieces are somewhat stiff and do not yield to the items that they carry.

It is an object of the present invention to provide an improved carrier member adapted to efficiently grip and transport objects.

SUMMARY OF THE INVENTION

In accordance with one aspect of the present invention, parallel conveyor chains carry a plurality of carrier members which define a conveyance channel that is generally parallel to the conveyor chains. Each carrier member has a holder adapted to be fixed to the chain link of the chain conveyor, the holder including a flat plate, and a gripper member comprising a generally hollow member of resilient elastic material fastened to the plate. The gripper member preferably comprises a rounded portion defining a hollow space, which is adapted to engage the loose articles and to deform so as to conform to the shape of the surface of contact of the loose article, and a flat portion which fastens against the plate of the holder. The gripper member acts at least with one other opposing gripper member to grip and convey an article along the conveyance channel. Bolts may be provided in the plate for securing the gripper member to the plate, and may pass through the flat portion of the gripper member into the hollow space where they are engaged by spring nuts. Peripheral grooves may be provided in each of the bolts to insure a firm seating of the spring nut on the bolt.

The bolts and spring nuts may be made of corrosion-resistant material, for example stainless steel. This is particularly effective where the carrier members of the drag chain conveyor are exposed during operation to gases or liquids which may have a detrimental effect on certain other metals.

The gripper member may be made of chloroprene rubber. Chloroprene rubber has been found to be substantially more resistant to the action of mineral oils and to loss of elasticity through aging than the types of ethylene-propylene rubber used hitherto. The use of chloroprene rubber permits reduction of the Shore hardness to, for example, 50 degrees without significant deterioration of quality during the expected useful life of the gripper.

A plurality of vertically disposed grooves may be located in the rounded portion of the gripper member, the grooves extending substantially parallel to the axis of the gripper member. These gripper members contact a substantial area of the article gripped, for example a glass article, in much the same way as a gripper member having a smooth gripping surface. The grooves divide the gripping surface into a plurality of zones for gripping the surface of the article being conveyed and for receiving and draining moisture squeezed off the surface of the article by the gripping zones. This squeezing and draining action not only enhances a good gripping contact between the gripper member and the conveyed article but acts to constantly clean the gripper zones and the grooves defined therebetween.

These and other features and advantages of the present invention will become more apparent from the following detailed description, taken in conjunction with the accompanying drawings which illustrate, by way of example, the principles of the invention.

DETAILED DESCRIPTION OF PREFERRED EMBODIMENT

Figure 1:
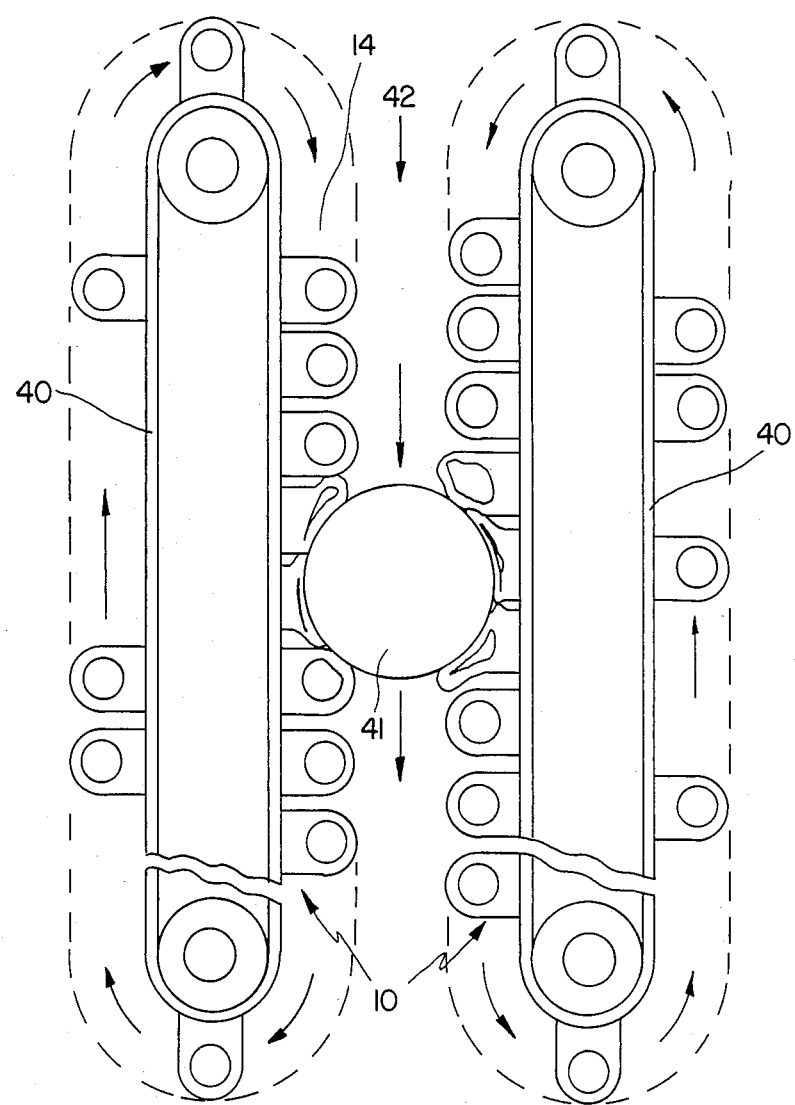
FIG. 1 is a diagrammatic plan view of a first embodiment of the invention, showing several elongate objects being carried along the channel defined between the gripper elements.
Figure 3:
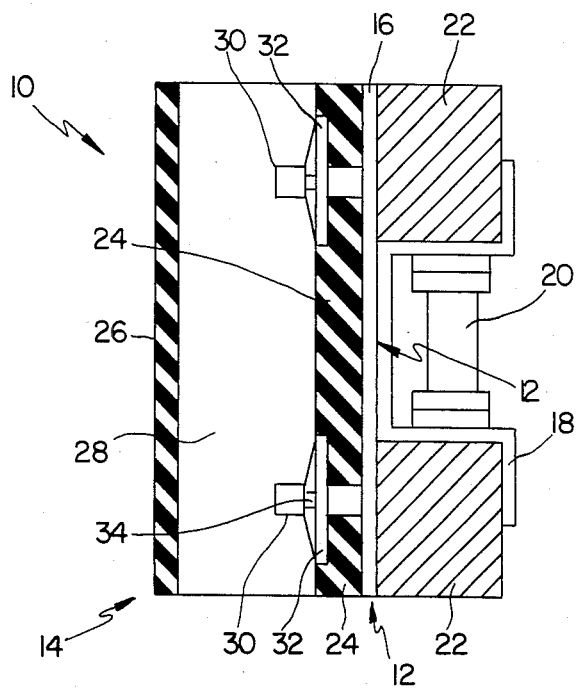
FIG. 3 is a plan view of the carrier of FIG. 2.

As illustrated in FIG. 1 of the drawings, there is shown a pair of conveyor chains 40 having a plurality of carriers 10. Each of the conveyor chains 40 has an opposing direction of rotation enabling carriers 10 to move at least one elongate article 41 in the channel 42 defined between them.

Figure 2:
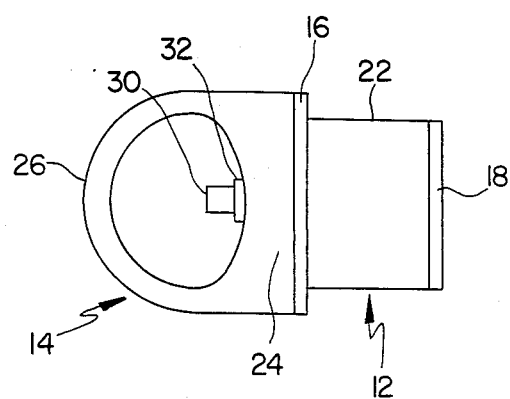
FIG. 2 is a front view of the carrier of the invention, showing the-gripper thereof in section.

In FIG. 2, carrier 10 is shown as comprising a holder 12 and a resilient gripper 14. The holder 12 comprises a flat plate 16 and a bow 18 which is substantially U-shaped, and joined to the plate 16 by, for example, welding. The bow 18 of the holder 12 is joined to a link 20, the link 20 forming a part of a conveyor chain. The carrier 10 is guided by a pair of slide rails 22 which are adapted to be received between the plate 16 and the bow 18, and are located on each side of the chain link 20.

The gripper 14 consists of a hollow, tube-shaped member of resilient material. Such resilient material may be a plastic material or rubber, preferably chloroprene rubber. The gripper 14 has a flat base portion 24 and a rounded gripping surface 26, which together define an open-ended hollow space 28.

The gripper 14 is attached to the plate 16 of the holder 12 along its base portion 24. A pair of bolts 30 are anchored to the plate 15 and extend through the base portion 24 through apertures into the hollow space 28.

Spring nuts 32 engage the free ends of the bolts 30 within the space 28 and firmly secure the gripper 14 to the plate ;6. A peripheral groove 34 is provided on each of the bolts 30 to improve the grip between such bolts 30 and the spring nuts 32. The bolts 30 and spring nuts 32 are both comprised of stainless steel.

Figure 4:
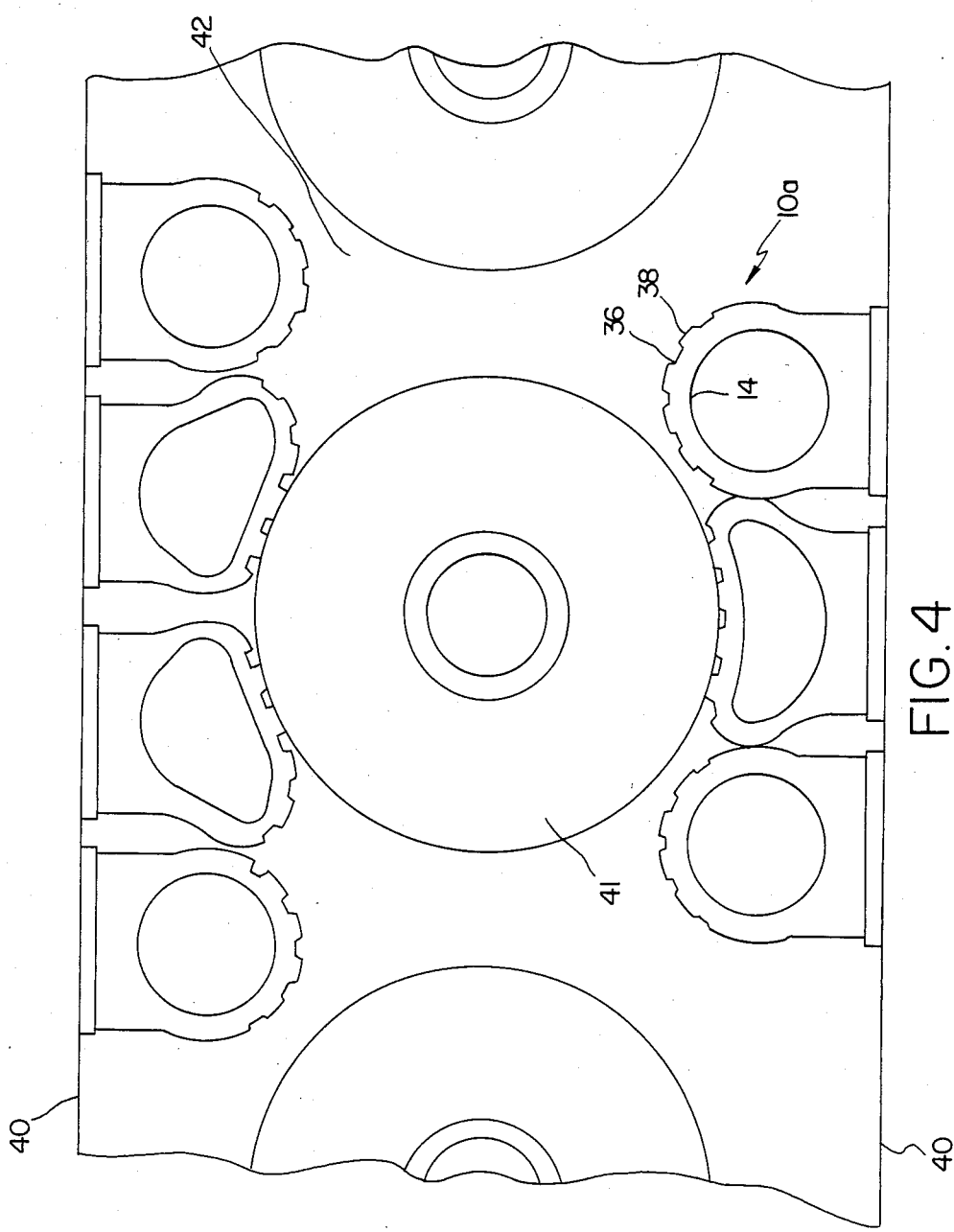
FIG. 4 is a diagrammatic plan view of a second embodiment of the invention showing grooved gripper elements deforming and moving an elongate object along the channel defined by the opposing gripper elements.
Figure 5:
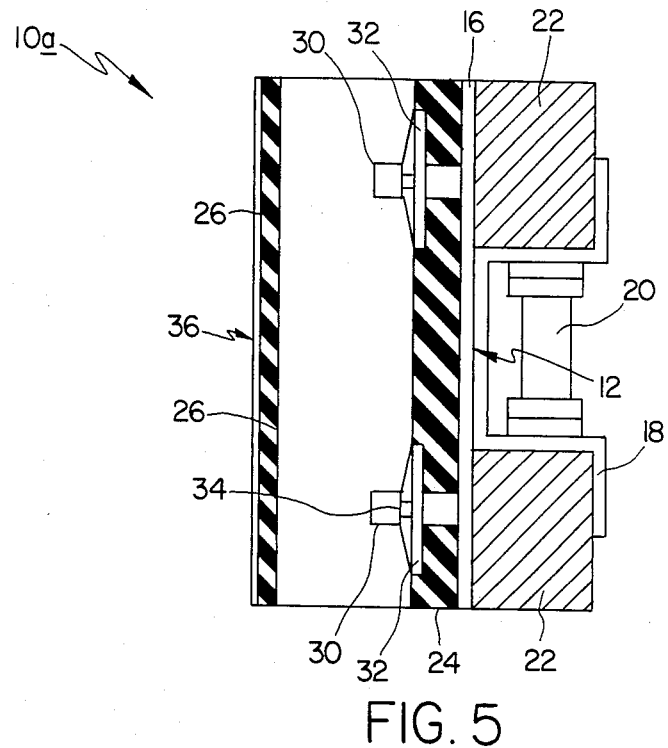
FIG. 5 is a front view of the carrier shown in FIG. 4 with the gripper thereof in section.
Figure 6:
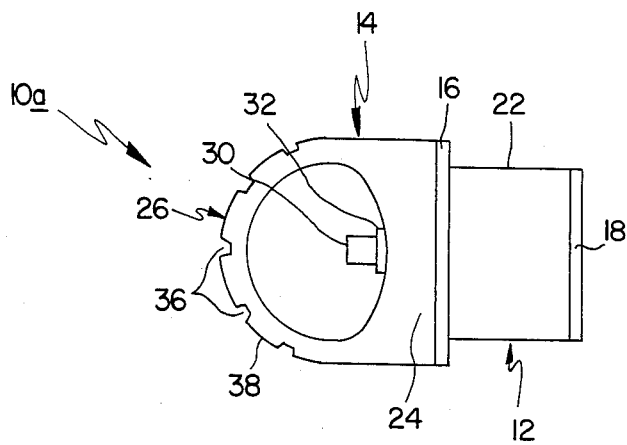
FIG. 6 is a plan view of the carrier shown in FIG. 5.

With particular reference to FIGS. 4, 5 and 6 of the drawings, there is shown a second embodiment of carrier 10a of the invention. In these Figures, parts corresponding to those in FIGS. 1 and 2 have been given identical reference numerals. FIG. 4 shows gripper elements 14 having grooves 36 in their surfaces and carrying through channel 42 defined between them, an elongate member 41. Each gripper 14 of the carrier 10a includes a plurality of parallel grooves 36 at spaced intervals over the gripping surface and thus defines a plurality of gripping areas 38 over the gripping surface 26 of the gripper 14.

In use, the carrier members 10, 10a are used in combination with a drag chain conveyor in the conveyance of loose articles, such as bottles 41. The drag chain conveyor consists of two conveyor chains 40 spaced apart and running parallel to each other. Each of the conveyor chains is actuated so as to move in the same direction when in the conveyance channel. The space between the two conveyor chains is the conveying channel 42 which accommodates the loose articles to be moved along the conveyor.

At least some of the links on each of the chain conveyors have attached thereto a carrier 10. Each carrier is attached to the link 20 such that the gripper 14 is disposed within the conveying channel and so that the gripping surfaces 26 of carriers 10 located on opposite conveyor chains face each other. In this way, loose articles in the conveying channel will be engaged by at least one of the gripping surfaces 26 of opposing carriers 10, the gripper surfaces deforming into various configurations to adapt to the part of the surface of the article which it contacts. By virtue of the movement of the conveyor chains, the loose articles will be moved through the conveying channel.

The present invention provides for carriers which are intended to move elongate articles such as bottles 41 while in an upright position. To do this effectively, the elongate articles 41 must be gripped over as much of their surface as possible, and this can best be achieved if the grippers 14 are adapted to change their contours so as to engage with that part of the elongate article that faces them. Since, for example, bottles 41 are of a convex shape, the grippers 14 should therefore become at least partially concave. The grippers 14 of the present invention are deformable, and generally tube-shaped. Their shape and material composition enable them to deform to substantially conform to the shape of the area of the elongate article which they contact. Grippers 14 therefore, act to securely grip and carry the articles to be conveyed along the conveying channel 42.

The gripper 14 is an inexpensive hollow member which can be fastened to the holder 12 in a relatively simple manner. No complicated mountings are required. The peripheral groove 34 which is provided on the bolts, and which may also be screwthreaded, ensures a firm seating of the spring nut 32 which will resist loosening even after long operation of the drag chain conveyor. Since the bolts and spring nuts are made of corrosion-resistant stainless steel, the exposure thereof during operation to gases or liquids which might have a detrimental effect thereon is minimized. From experimentation, it has been found that the use of stainless steel spring nuts and bolts in combination with groove 34, provides the most effective corrosion-resistant seating for the carriers.

The provision of a chloroprene rubber surface has been found to be particularly advantageous as it is substantially more resistant to the action of mineral oils and to loss of elasticity and therefore adhesive power, through aging than other types of previously used ethylene-propylene rubber. With the use of chloroprene rubber, it is even possible to reduce the Shore hardness to, for example, 50 degrees, without any substantial deterioration of quality during the expected useful life of the gripper.

In another embodiment of the invention, a plurality of vertically disposed grooves 36 divides the gripping surface 26 into a plurality of action zones 38. These grooves 36 facilitate proper contact between the gripper members 14 and the bottle surface, acting as a type of flexible hinge between the action zones so that the gripper 14 can fully adapt to the curvature of the bottle surface. The grooves act as a drainage duct for liquid that adheres to the gripper surface and the bottle surface. When a glass article is gripped by the gripping surface, liquid which is present on these surfaces is the liquid which at first adheres to squeezed off into a groove 36 from which it can flow out. The drainage of this liquid enhances the contact effectiveness between the gripper 14 and the object 41.

The movement of the displaced liquid also contributes towards the self-cleaning of the rounded portion of the gripper member. The dirt collecting in the grooves over a period of time is removed during the cleaning of the drag chain conveyor when subjected to superheated high-pressure steam. In this way, the dirt will tend to accumulate in the grooves and not on the gripping surface which will therefore be able to perform more effectively.

The carrier of the present invention thus facilitates the reduction of interruptions of operation, and time wastages due to the need to replace or clean carriers.

The tube-like gripper members 14 are able to change their position while their gripping surfaces 26 remain in adhesive contact with the surface of the conveyed object. This strong gripping contact during conveyance guarantees that the object being conveyed has the same position within the conveying channel 41 at its final destination as it had at its origin.

The carrier of the invention is not limited to those details described above and various modifications or improvements may be made thereto within the scope of the appended claims.

What is claimed is:

1. A carrier member for use on a drag chain conveyor arranged to convey generally elongate articles, the carrier member comprising:
   a holder adapted to be connected to a link of the chain conveyor, the holder having a plate;
   a resilient gripper member having an axis which is substantially perpendicular to the direction of conveyance of the drag chain conveyor and substantially parallel to the axes of the elongate articles and adapted to be conveyed by the carrier member, the gripper member having a hollow open-ended tubular portion with the axis thereof being substantially perpendicular to the direction of conveyance and a base portion engaging the plate and a gripping surface on the tubular portion, the gripper member being adapted to deform so as to substantially conform to and engage the area of an article it contacts, such deformation being facilitated as a result of the hollow open-ended tubular portion, with the area of contact being substantially increased as a result of deformation of the gripper member; and
   securing means for securing the gripper member to the holder such that the securing means are unable to come into direct contact with the elongated articles.

2. A carrier as claimed in claim 1 wherein the securing means is comprised of at least one bolt anchored to the plate, the bolt passing through the base portion of the gripper member and having at least one peripheral groove; and a spring nut adapted to engage the free end of the bolt to secure the gripper member firmly to the plate.

3. A carrier as claimed in claim 2 wherein the bolt and spring nut are comprised of a corrosion-resistant material.

4. A carrier as claimed in claim 3 wherein the corrosion-resistant material is stainless steel.

5. A carrier as claimed in claim 1 wherein the gripper member is comprised of chloroprene rubber.

6. A carrier as claimed in claim 1 wherein the gripping surface includes a plurality of grooves extending parallel to the axis of the hollow gripper member.

7. A carrier as claimed in claim 1 wherein the gripper member is generally tubular in shape.

8. A gripper member for a carrier member used with a drag chain conveyor for conveying generally elongate articles, the gripper member comprising a base portion and an open-ended hollow tubular portion the axis of which is substantially perpendicular to the direction of conveyance of the drag chain conveyor and substantially parallel to the axes of the elongate articles when moved by the conveyor, the hollow tubular portion being made of chloroprene rubber and having a gripping surface with a plurality of grooves extending substantially parallel to the axis of the gripper member, the gripper member being adapted to deform along at least a part of its surface so as to adapt to and substantially conform to an area of contact of an article, such deformation being facilitated as a result of the open-ended hollow tubular portion, with the area of contact being substantially increased as a result of deformation of the gripper member, and engage the article along the area of contact.

9. A carrier as claimed in claim 1 wherein the securing means project through the plate into the hollow tubular portion of the gripper member.

* * * * *